United States Patent
Henze et al.

(10) Patent No.: US 7,037,591 B2
(45) Date of Patent: *May 2, 2006

(54) CLEANING-FRIENDLY APPARATUS WITH AN EASILY CLEANABLE, HEAT-RESISTANT SURFACE COATING

(75) Inventors: Inka Henze, Udenheim (DE); Lutz Klippe, Wiesbaden (DE); Cora Krause, Burrweiler (DE); Bernd Metz, Mainz (DE); Juergen Dzick, Nieder-Olm (DE); Bernd Schultheis, Schwabenheim (DE)

(73) Assignee: Schott AG, Mainz (DE)

(*) Notice: Subject to any disclaimer, the term of this patent is extended or adjusted under 35 U.S.C. 154(b) by 29 days.

This patent is subject to a terminal disclaimer.

(21) Appl. No.: 10/635,950

(22) Filed: Aug. 7, 2003

(65) Prior Publication Data
US 2004/0105985 A1 Jun. 3, 2004

(30) Foreign Application Priority Data
Aug. 9, 2002 (DE) ................................ 102 36 728

(51) Int. Cl.
*B32B 9/04* (2006.01)
*B32B 15/00* (2006.01)

(52) U.S. Cl. .................. 428/447; 428/426; 428/428; 428/446; 428/450; 428/689; 428/332; 126/19 R

(58) Field of Classification Search ............... 428/426, 428/428, 432, 446, 447, 450, 689, 332; 126/19 R
See application file for complete search history.

(56) References Cited

U.S. PATENT DOCUMENTS

| | | | |
|---|---|---|---|
| 3,617,366 A * | 11/1971 | Tully et al. | 428/206 |
| 5,281,893 A * | 1/1994 | Matsuda et al. | 313/478 |
| 5,424,130 A * | 6/1995 | Nakanishi et al. | 428/410 |
| 5,523,162 A * | 6/1996 | Franz et al. | 428/421 |
| 5,674,625 A * | 10/1997 | Takahashi et al. | 428/428 |
| 5,997,943 A * | 12/1999 | Azzopardi et al. | 427/167 |

FOREIGN PATENT DOCUMENTS

| | | |
|---|---|---|
| DE | 692 10 784 T2 | 9/1996 |
| DE | 43 26 502 C2 | 11/1996 |
| DE | 695 02 671 T2 | 1/1999 |
| DE | 695 08 369 T2 | 10/1999 |
| DE | 695 15 962 T2 | 12/2000 |
| DE | 42 18 657 C2 | 10/2001 |
| EP | 492545 A2 * | 7/1992 |
| EP | 0 658 525 A2 | 6/1995 |
| JP | 11-92175 | 4/1999 |
| WO | 99/02463 | 1/1999 |
| WO | 99/64363 | 12/1999 |

OTHER PUBLICATIONS

Patent Abstracts of Japan 2001295039 A, Oct. 26, 2001.
Patent Abstracts of Japan 05051238 A Mar. 2, 1993.
Patent Abstracts of Japan 05170488 A Jul. 9, 1993.
Patent Abstracts of Japan 07157335 A Jun. 20, 1995.
Patent Abstracts of Japan 11092175 A Apr. 6, 1999.
Patent Asbtracts of Japan 10182189 A, Jul. 7, 1998.
Jeong, H., et al: "Preparation of Water-Repellent Glass by Sol-Gel Process Using . . . " Journal of Colloid and Interface Science 235, 130-134, 2001.

* cited by examiner

*Primary Examiner*—Stephen Stein
(74) *Attorney, Agent, or Firm*—Michael J. Striker

(57) ABSTRACT

The cleaning-friendly article, such as a household kitchen appliance, which is suitable for heating food and/or directly connected with this unit, has a suitable long-lasting or permanent easily cleaned coating on its surfaces that are accessible to dirt. In order to provide this easily cleaned coating a mixture is applied to these surfaces, which contains a hydrolyzable, network-forming gel and a hydrophobic substance. The gel is preferably formed from metal oxides. such as $SiO_2$, $Al_2O_3$, $Fe_2O_3$, $In_2O_3$, $SnO_2$, $ZrO_2$, $B_2O_3$ and/or $TiO_2$. The hydrophobic substance is preferably chemically combined with the gel network. The hydrophobic substance preferably includes pre-condensed fluoroalkyl-silanes.

13 Claims, No Drawings

CLEANING-FRIENDLY APPARATUS WITH AN EASILY CLEANABLE, HEAT-RESISTANT SURFACE COATING

BACKGROUND OF THE INVENTION

1. Field of the Invention

The present invention relates to an apparatus with an easily cleaned, surface coating, which is heat-resistant at least up to 300° C.

2. Description of the Related Art

Equipping objects with dirt-repellant substances is generally known. For example, it is also known to treat glass, glass ceramic, glazed, enamel or even stone surfaces with silicones in order to make these surfaces dirt and water-repellant. Similarly metal and plastic surfaces can be made dirt and water-repellant. For that purpose usually the surfaces of the objects to be treated are made hydrophobic by application of a liquid composition. Many different chemicals, especially silicone oils and/or fluorinated silanes, are used for this purpose. The surfaces treated in this manner have proven to be difficult to wet, whereby water forms beads on them. Dirt adheres only weakly on the treated surfaces and may be easily removed.

The above procedure has however the disadvantage that the applied chemicals only react directly with the OH groups immediately available on the substrate material and only form strong bonds there. Also a suitable pre-treatment, for example with a hydrogen/oxygen plasma or a suitable adhesive substance, can only increase the density of the applied chemicals on the surface of the article, especially a glass, metal and plastic article. However this type of pre-treatment cannot increase the thickness of the coating or layer, so that only monomolecular hydrophobic layers are produced, which are quickly rubbed off during usage, especially under mechanical loads or stresses, such as occur during cleaning with household auxiliary and cleaning agents. Thus the desired property of easy cleanability is lost.

It has thus already been attempted to increase the adherence or service life of this sort of coating. For example, EP A 0,658,525 describes the manufacture of a water-repellant multi-layer film. For this purpose three different sol-solutions are made, mixed and applied to a glass substrate and gel coatings are produced on glass surfaces. A metal oxide surface coating is then produced by heating. A fluoroalkyl-silane layer is then applied on this metal oxide coating.

JP A 11 092 175 describes a process, in which methoxysilane or an ethoxysilane compound, which contains a fluorocarbon chain, is fixed on the surface of small particles with diameters of 100 nm. Then the modified particles are dissolved in an aqueous medium and applied to a surface to be coated, the solvent is removed and the residue is subsequently burned into the surface. In this way a surface coated with small hydrophobic particles is produced.

A method of making a water-repellant surface is described in WO 99/64363, in which the surface of the glass is first roughened and the metal ions present on the surface are removed. After that a water-repellant film is applied to the surface to be treated in a known manner. By roughening the surface the indentations of the roughened surface are filled with hydrophobic material.

In WO 99/02463 a method of making a scratch resistant coating is described, in which an organic substance with a silicone-type network is applied to the surface. Subsequently a heat treatment is performed. The temperature and duration of the heat treatment are selected so that the purely organic layer is largely destroyed and/or removed. However the inorganic molecules in the upper-most layer of the substrate and the organic molecules of the applied coating can bond chemically. In this way an organic substance, for example a methyl group, is bonded directly to the silicon atom of the glass surface directly with a Si—C bond.

DE 695 02671 T2 (WO9S/24053) describes a signaling device with a display screen. The display screen has a non-absorbing coating layer made from a hybrid inorganic-organic material and an inorganic network of silicon oxide and metal oxide. In that the polymer chains are interwoven with the inorganic network and form a hybrid inorganic-organic network. However it has been shown that the organic components, especially hydrophobic organic components, such as fluoroalkyls, are not built into this sort of coating or layer uniformly, but that they are deposited substantially on the surface facing the substrate layer. For this reason this outer hydrophobic coating is comparatively easily rubbed off or removed by rubbing.

All the coatings made with these prior art methods have hydrophobic and, if necessary, dirt-repellant properties, which have proven to be not sufficiently permanent and are rapidly lost, especially, under application of mechanical stress.

SUMMARY OF THE INVENTION

It is an object of the present invention to provide an easy-to-care-for apparatus, especially a kitchen appliance, and/or an easy-to-care-for article, whose surfaces have an easy-to-care-for and dirt-repellant finish, which resists rubbing off under mechanical stress. The easy-to-care-for and dirt-repellant finish should also be formed so that it is either visible or not according to the requirements or specifications.

It is also an object of the present invention to provide an easy-to-care-for apparatus, especially a kitchen appliance, and/or an easy-to-care-for article, whose surfaces have an easy-to-care-for and dirt-repellant finish, which resists rubbing off under mechanical stress, substantially longer than the corresponding surfaces of currently known kitchen appliances.

It is a further object of the present invention to provide commercial articles, especially a household or kitchen appliance, whose surfaces have this sort of easy-to-care-for and dirt-repellant finish, which does not change or noticeably change the optical properties of the article.

These objects are attained according to the invention by the apparatus defined in the claims appended below and the results achieved by it.

According to the invention the apparatus hash an easily cleaned surface coating that is heat-resistant at temperatures of at least 300° C., outstanding properties and a thickness between 1 and 1000 nm. The surface coating contains a metal oxide network and a hydrophobic substance, which is distributed uniformly across the thickness of the surface coating. The surface coating is hydrophobic and has a contact angle for water of greater than 90°.

According to the invention it has been found that a uniformly resistant coating and/or a coating on an article with uniform properties in cross-section may be achieved when its surfaces are provided with a layer, which includes a thin metal oxide network and/or a metal oxide matrix, in which a hydrophobic substance is uniformly distributed throughout the network. The coating is usually a uniformly formed coating from a coherent surface metal oxide network. The metal oxide network obtained by the apparatus according to the invention can have open or closed pores.

The metal oxide coatings are formed by thermal treatment of an applied gel coating and remain as a solid coating on the product. The properties of these coatings remain undisturbed by the possibility that the surfaces to be coated are suitably activated (for example by plasma treatment, application of a suitable adhesive) prior to producing these coatings. Similarly it is possible to mix in an adhesive into the coating solution. The hydrophobic substance is uniformly distributed in the surface coating. It is equally significant that, in contrast to the above-described solutions, where only a significant amount of the hydrophobic surfaces is found near the boundary surface, in the surface coating according to the invention a significant concentration of the hydrophobic substance is found throughout the surface coating, which is detectable by means of a SIMS measurement. In this way the surface coating has the desirable properties according to the invention, even when surface wear removes a top portion of the surface coating.

The gels used to make the apparatus according to the invention are, especially metal oxide gels, which are made by means of a sol-gel process. In this process the gels are formed in situ during application on the apparatus or article to be coated. A continuous uniform gel network is produced on the surface of the article to be coated. Preferred metal oxides are $SiO_2$, $Al_2O_3$, $Fe_2O_3$, $In_2O_3$, $SnO_2$, $ZrO_2$, $B_2O_3$ and/or $TiO_2$. Hydrogels, alkogels, xerogels and/or aerogels are preferred gels. The addition of the hydrophobic, if necessary also oleophobic, substance to the sol mixture takes place prior to and/or during the formation of the gel, so that the hydrophobic substance is uniformly distributed throughout the entire volume of the gel network that is formed. Also the hydrophobic substance is chemically bonded with the gel network by polycondensation, for example of its silanol groups. In this way it is possible to impart especially wear-resistant and permanent dirt-repellant properties to the treated surface.

The general manufacture of gel coatings by means of a sol-gel process is known in itself and described in many prior art references. In this process it usually proceeds so that a polymer reaction with inorganic metal salts or metal organic compounds, such as metal alkoxides, occurs by hydrolysis in a solution, preferably an aqueous solution and/or alcoholic solution, so that a colloidal suspension arises, i.e. a sol is produced. A coherent polymeric gel network is formed from the sol by further hydrolysis and condensation. Preferably the gel is immediately formed during the coating process. The final formation of the entire gel network is accelerated preferably by heating. Typical temperatures amount to between 0° and 400° for this purpose, preferably between 20° and 400°, and especially preferably between 250° and 380°, and most preferably at 300°. The acceleration of the hydrolysis can be controlled so that the gel is as dense as possible. That means that the gel network has no pores, or more or less only a very few pores. Metal alkoxides are, preferably, $C_1$–$C_4$-metal alkoxides, in which metal methylates and metal ethylates are especially preferred. Metal nitrates are especially preferred metal salts. The hydrolysis is usually started with an excess of distilled water to form the sol and then the sol forms at ambient temperature, if necessary at an elevated temperature, by standing a comparatively long time interval, for example two to four days.

All hydrophobic substances, which can be incorporated in the forming gel, are generally suitable as the hydrophobic substance used in the invention. For the process of the invention it is preferable to use those hydrophobic substances, which distribute as rapidly as possible in the gel forming sol solution. The hydrophic substances used in the process according to the invention are preferably slightly water-soluble or can be made water-soluble by solubilizing agents or by hydrolysis. In a further preferred embodiment of the process the oleophobic substances used in the invention have a chemical modification, which imparts water-solubility. This sort of modification is the introduction of a water-solubility imparting group, such as an amino group or an acid group. For example, natural and synthetic oils and/or linear fatty acids, especially fatty acids with chain lengths of at least six carbon atoms, preferably at least ten carbon atoms are used for this purpose. Silicones and silanes, siloxanes, silicone oils and silicone fats are especially preferred hydrophobic oleophobic substances. The silicone compounds used according to the invention can be branched or straight chain, or, if necessary, they can contain cyclic silane groups. In a preferred embodiment they contain a water-solubility-imparting functional group, such as an amino group, whose hydrogen atoms if necessary can be replaced or substituted.

The hydrophobic substances used according to the invention are, preferably fluorine containing and especially have at least five percent, preferably at least 10 percent fluorine atoms (in relation to the total number of atoms of the introduced hydrophobic substance after sintering). However more preferably they have however at least 20 percent fluorine atoms, and more especially at least 30 percent fluorine atoms. Although it has been shown that the dirt repellant finish is permanent when the hydrophobic substances is introduced by the in situ process according to the invention, it is preferred to combine the hydrophobic substance chemically in the gel network by means of reactive groups, especially by means of reactive silanol groups. Methoxy, ethoxy, propoxy, butoxy or isocyanato groups as well as chlorosilane are especially preferred as the hydrophobic material.

Preferred silanes for the process according to the invention have the general formula (I):

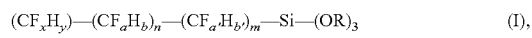

$$(CF_xH_y)-(CF_aH_b)_n-(CF_{a'}H_{b'})_m-Si-(OR)_3 \qquad (I),$$

wherein x is 1, 2 or 3 and x+y=3, a and a' is 1 or 2 and a+b and a'+b'=2 n and m, independently of each other, are integers from 0 to 20 and n+m≦30; and wherein R is a straight chain, branched, saturated or unsaturated $C_1$- to $C_8$-alkyl group, which optionally contains a heteroatom.

Preferred alkyl groups include methyl, ethyl and propyl groups, as well as their amino derivatives. According to the invention silanes are preferred, which have functional groups including a heteroatom or heteroatoms, which impart or increase solubility of the silanes. The heteroatoms and/or functional groups are built into the backbone of the alkyl-hydrocarbon chain and/or the fluoroalkyl-hydrocarbon chain and/or are present as substituents. Aminoalkyl groups and/or aminofluoroalkyl groups are preferred according to the invention.

In a preferred embodiment x=3 and y=0 so that the above-mentioned general formula I has a terminal $CF_3$ group. In an further preferred embodiment of the invention a=2 and a'=0 so that $CF_2$ and $CH_2$ blocks or groups are formed. Understandably more than two blocks can be present in the chain and the $CF_2$ and $CH_2$ blocks can be interchanged. Generally it is preferred to arrange the fluorinated blocks terminal to the Si atom as much as possible. Preferred values for n are 1 to 10, especially 1 to 8. Preferred values for m are 0 to 10, especially 0 to 8. In the gel solution applied weight ratios of hydrophobic substance to gel network of 0.01:1 to 1:1 are preferred. A weight ratio between 0.05:1 and 0.2:1 is especially preferred.

The fluoroalkyl silanes are added in such amount, that their content in the finished matrix amounts to preferably at least 3 Mol %, especially at least 5 Mol % and usually at least 7 Mol %. The highest amount is preferably 55 Mol %, especially 50 Mol % and/or 45 Mol %. In many cases a highest amount of 40 Mol % is completely sufficient. It has been shown that especially good hydrophobic and dirt repellant properties are obtained by addition of an amount of over 3 Mol % fluoroalkylsilane per matrix. These properties are sufficient to prevent backing of food residues on during heating, for example, which occurs in a baking oven.

According to the invention pre-hydrolyzed silanes are especially preferred. In an especially suitable embodiment the hydrophobic fluoroalkylsilanes, especially the long chain fluoroalkyl silanes, are pre-condensed. The pre-condensation occurs at temperatures under 60° C., particular under 55° C., especially in a concentrated state. However temperatures under 50° C. and/or 45° C. are especially preferred. The pre-hydrolysis is performed according to the invention with as little water as possible. Generally the water is present in excess in relation to the hydrolyzable groups. Preferably the pre-hydrolysis is performed with less than 50 percent by weight water (in relation to the total weight of the solution of the pre-hydrolysis), especially less than 45 and/or 40 percent by weight water. It is especially preferred to perform the pre-hydrolysis with at most 35 and especially at most 30 percent by weight water. The minimum hydrolysis amount amounts to 0.1 percent by weight and/or 0.2 percent by weight, wherein 0.5 percent by weight and 1 percent by weight are common minimum amounts. For the final hydrolysis in the coating solution preferred minimum amounts of 0.1 and/or 0.2 percent by weight water are common. In many cases also minimum amounts of one and/or two percent by weight water are common.

The mixing of the pre-condensed fluoroalkylsilane and the tetrafunctionalized silane is performed in nearly equal reaction stages. It has been shown that the fluroalkylsilane is especially well bonded to the tetrafunctionalized silane during the sol-gel formation. The reaction is clearly accelerated in this manner. It has also been shown that the fluoroalkylsilane dissolves especially well in the tetraalkylsilane in this procedure, whereby the uniform distribution is improved.

A pre-condensation of at most 50 hours is especially preferred, especially of at most 45 hours. Preferably minimum times are 6 hours, especially 12 hours, wherein at least 18 hours is especially preferred. Common minimum times for the pre-condensation amount to at least 24 hours. In individual cases however it can be considerably lower.

The mixture of gel and hydrophobic substance is applied by means of a coating process, such as dipping, rolling, throwing, polishing in, rolling on or spraying. Spraying, throwing and dipping coating methods are preferred. The thickness of the coating may be controlled by control of the coating solution viscosity and the drawing speed with which the object to be coated is drawn from the coating solution. According to the invention attained coating thickness amounts to between 0.5 nm to 1 µm. A coating thickness of at least 5 nm, especially at least 10 and/or 20 nm, is preferred. The maximum coating thickness is less than 200 nm, especially 100 and/or 80 nm, particularly for coatings made by dipping. Spraying provides generally thicker coatings. In this latter case coating thickness greater than 40 nm, especially greater than 50 nm and/or 60 nm, is preferred.

After application the coating is dried at room temperature for at last one minute, preferably at least three minutes and subsequently hardened at higher temperatures. The drying time depends on the thickness of the produced coating, the actual temperature and the vapor pressure of the solvent. It is preferably at least one minute and especially preferably at least 3 minutes at room temperature. Common drying times amount to 4 to 6 minutes. The sintering and hardening of the applied coating occurs preferably at temperatures of 150° C. to 400° C., preferably from 250° C. to 380° C. The duration of the hardening usually amounts to at most one hour. However a maximum hardening time of 45 minutes, especially 30 minutes, is preferred. The coating itself is stable up to at least 300° C., preferably up to 400° C.

It is possible to adjust the viscosity of the coating solution, especially the dipping solution, exactly to a drawable value by means of the hydrolysis degree. In this way the produced coating thickness is exactly reproducible with known viscosity and known drawing speed. A change of the viscosity of the coating and/or dipping solution during usage may be adjusted to the desired value in a simple manner by thinning with a solvent, such as ethanol, or by adding additional hydrolizable sol-gel solution.

During manufacture of the coated apparatus or article according to the invention it is also possible to adjust the index of refraction of the coating to the substrate material. This is possible for example by mixing of different metal oxides. $SiO_2$ has an index of refraction of n=1.45, $TiO_2$, 2.3. In a $SiO_2/TiO_2$ system the index of refraction value is arbitrarily adjustable between these two extreme values. By adjusting the index of refraction and the coating thickness the process according to the invention is especially suitable for making interference coatings, such as anti-reflective coatings.

In a special embodiment according to the invention the permanent hydrophobic coating is provided with a surface microstructure, whereby the hydrophotic properties of the coating are improved or amplified and its cleaning is even easier and/or the coating has an anti-reflective action and/or is increased. This microstructure is provided before, during or after the thermal hardening. These features may be produced by means of introducing particles or indentations. In this way a surface microstructure, which has, for example, nubs or burls, which limit the contact of dirty parts with the coated surface according to the invention, as it is, for example, in the case of the so-called lotus effect. The desired cleaning effect is further improved in this way.

In an additional embodiment of the invention the apparatus, especially the substrate supporting the surface coating is activated at least at the places supporting the surface coating. These types of activating processes are many and well known to one skilled in the art. They include oxidation and plasma treatment or treatment by mans of acid and/or alkali. Similarly it is possible to apply one or more adhesive layers to these places before coating the article according to the invention. These adhesive layers are many and well known to those skilled in the art. It is easy to find an appropriate adhesive for a given substrate material. Silanols with reactive groups are conventional adhesive agents. For example, an acrylsilane, such as methacryloxide-alkyltrimethoxy-silane, is suitable for plastic material. Treatment with chromium oxide as adhesive material has proven suitable for metals. In individual cases it has proven to be appropriate to roughen the substrate surface, especially by etching, In another preferred embodiment the surface coating has nanoscale particles, especially those of greater hardness.

This sort of particle has an average particle size of less than 800 nm, preferably less than 500 nm, and especially less than 200 nm. A particle size of less than 100 nm is especially preferred. In many cases even particles sizes of less than 50 and less than 10 nm have proven suitable. In a further preferred embodiment this sort of particle is provided with a hydrophobic substance on its surface. These hydrophobic substances can be as previously described above. The coating can be colored and/or it can be made optically visible by coloring of these particles or mixing with colored pigments.

In principle the apparatus or article can include any arbitrarily chosen material, which can withstand the previously described sintering temperature, as the substrate or base for the surface coating according to the invention. For this purpose these substrate or base materials can include especially metals, plastics, inorganic mineral materials, stone, such as marble, granite, burned clay and glass, glass ceramic, if necessary even wood.

The apparatus according to the invention can be used for heated and also cooled applications, and indeed as in both household and also commercial areas, such as offices, kitchens, bakeries, laundries, etc. It is especially useful for refrigeration applications, which involve directly or indirectly the preservation of food, and for the outer surfaces of the units or enclosures, which are exposed to significant amounts of dirt by contaminated air. Especially these surfaces include the so-called interactive surfaces for operation of units and built-in household installations or the operating surfaces for different appliances. This type of apparatus or apparatus body includes the so-called white-ware, such as a refrigerator, a refrigerator/freezer, cooling units, dishwashers, cloths washers, washer-dryers, gas ranges, electric ranges, microwaves or even oil burners as well as so-called brown-ware with display tubes, such as television sets and computer monitors.

The invention also concerns especially easy-to-care-for kitchen equipment as well as at least one or more combinations of several parts, such as household equipment, especially baking ovens, cooking ranges, microwaves, grill units, exhaust vapor hoods and the operating devices associated with them. Primarily the invention is applicable to apparatus, which is used for heating or suitably processing food in any way and manner or with apparatus connected with those activities. All surfaces, or at least one surface, i.e. both outer surfaces and inner surfaces, of this type of apparatus are exposed to significant amounts of dirt and soiling material. This type of apparatus includes also kitchen auxiliary equipment, such as mixers or puree forming machines, and even cutting boards and cutting equipment, such as knives and cutting wheels.

This kitchen equipment and/or parts thereof are exposed to a high risk of contamination because of the preparation of foods of all types. Very different types of contamination are involved. The entire stock of usable food at very different temperatures can come into contact with surfaces of kitchen equipment, which are similar at greatly varying different temperatures. The invention includes cleaning-friendly kitchen equipment whose surfaces are easily cleaned off with common household cleaning agents independently of the existing state of the dirt and using minimum amounts of gentle household cleaning agents. Until now no kitchen equipment was marketed, which could be so easily completely cleaned.

The coatings according to the invention are especially resistant to wear and heating loads. They can withstand high temperatures of over 310° C. without loosing their desirable properties. The coatings can remain in an oven at different temperatures for long times. Coated articles, such as oven doors, (e.g. the interior window of an oven) can be kept at a temperature of 280° C. for 10,000 hours and of 290° C. for 1,000 hours and 300° C. for 100 hours, and/or 310° C. for 30 hours without damage.

The apparatus according to the invention can however also contain an interference optical layer package or packet, for example it can have anti-reflecting coating. This sort of anti-reflecting coating is preferred as the outermost layer bounding the surroundings and/or air.

The article according to the invention can also have an additional protective layer for the above-described surface coating. The additional protective layer can comprise enamel and decorative or functional printing. The decorative or functional printing is made with a ceramic or organic decorative paint. Alternatively the additional protective layer comprises enamel without any printing. Also the additional protective layer can be decorative or functional printing without the enamel.

The invention will be illustrated in more detail by the following examples.

EXAMPLES

Example 1

Manufacture of Hydrophobically Modified $SiO_2$-Dipping Solution a) A mixture A of 13.6 g tetramethylorthosilicate (CAS: 681-84-5 obtainable under the trademark DYNASIL® TM M of Degussa AG, Frankfurt, Germany and 13.6 g 96% ethanol is prepared. Then a mixture B of 3.75 g distilled water and 0.15 g 36% HCl is prepared. Mixtures A and B are combined and stirred for 10 minutes at room temperature. After that a mixture of 1.4 g of water-soluble modified fluoroalkylsiloxanes (preferably pre-hydrolyzed) (CAS 54-17-5, obtainable under the trademark DYNASYLAN® TM F8800 of Degussa AG, Frankfurt, Germany) and 175 g 96% ethanol with stirring. These mixtures are used as dipping solutions.

b) Similar to a) a mixture A comprising 13.6 ethylpolysilicate (comprising tetraethyl silicate, obtainable under the tradename DYNASYL® 40 of Degussa AG, Frankfurt, Germany) and 13.6 g of 96% ethanol is prepared. Also a mixture B of 3.8 g water and 0.15 g of 36% hydrochloric acid is prepared. Then both mixtures are combined and stirred for 10 minutes. After that a mixture of 1.4 g of water-soluble modified fluoroalkylsiloxane containing aminoalkyl functionalized substituents (preferably pre-hydrolyzed) (CAS Nr. 64-17-5, obtainable from Degussa AG, Frankfurt, Germany, under the trademark DYNASYLAN® TM F8800) and 175 g 99.5% ethanol, are added together with stirring.

c) A mixture of 254.2 g of 99.5% ethanol, 77.6 g water, 7.2 g glacial acetic acid and 90.8 g tetramethylorthosilicate (DYNAYSIL® TM M, as above) is stirred and allowed to stand for 24 hours. After that 25 g of the concentrate obtained are mixed with 75 g of 99.5% ethanol with stirring. After that a mixture of 100 g of 99.5% ethanol and 1.4 g of a fluoroalkyl-functionalized water-soluble polysiloxane, which is made water-soluble by means of an aminoalkyl functionalized substituent (preferably pre-hydrolyzed) (CAS Nr. 64-17-5), DYNASYLAN® TM F8800), are stirred together, whereby the finished dipping solution is produced.

d) 88.6 ml of silicic acid methyl ester, 80 ml distilled water and 10 ml of glacial acetic acid are stirred into 240 ml ethanol. The solution obtained is allowed to stand for 42 hours. Then it is diluted with 1,580 ml ethanol and the hydrolysis is stopped with 2 ml of a 37% hydrochloric acid solution. After that 9.3 ml tridecafluoroctyltriethoxysilane (preferably pre-hydrolyzed) (obtainable under the trademark DYNASYLAN® F8261 of Degussa-Hüls, Frankfurt, Germany) are added with stirring.

The coating was applied by means of a single dipping process. Subsequently it would be dried for five minutes at room temperature and burned in at 250° C. for a maximum of 30 minutes, whereby the silica gel hardens.

Example 2

Manufacture and Testing of the Coatings According to the Invention

A cleaned, 10×20 cm borosilicate glass plate, which is 2 mm thick, was dipped in the $SiO_2$ dipping solution described in example 1 at room temperature and drawn from the solution at a speed of 20 cm/min. Subsequently the coating applied was dried for five minutes and then burned in an oven for 20 minutes at 250° C. (Table I, coating 1) or at 300° C. (Table I, coating 2). After the burning in the coating according to the invention has a thickness of about 120 nm. The judging of the hydrophobicity occurred by measuring the contact angle for water on the coating. This was performed with a contact angle measuring unit "G10" of KRÜSS, Hamburg, Germany. For example, this shows that a freshly cleaned glass surface has a contact angle for water of less than or equal to 20 degrees, a mounted glass surface, about 60 degrees, and a freshly hydrophobically treated or coated glass surface greater than or equal to 100 degrees.

Immediately after making the surface coating according to the invention a value of 110 degrees was found for the contact angle of water with the surface coating according to the invention. After that a Schrubb test was performed as follows: a felt flap moistened with water, which had a surface area of about 3 cm, was loaded with a total applied mass of m=1 kg and moved back and forth on the test sample. This involved repeated load cycles comrpising back and forth motions.

After 500 load cycles were performed during the Schrubb test the contact angle was again measured and found to be still 102°, after 1000 load cycles it was found to be 103 degrees and after 2000 load cycles it was still 100 degrss with a measurement accuracy of ±3 degrees.

Example 3 (Comparative Example)

Hydrophobic Coatings Prepared Using Fluoroalkylsilanes

By applying tridecafluoroctyltriethoxysilane ("F8262" of Degussa-Hüls) a hydrophobic glass surface according to the state of the art was prepared: a full surface coating of fluoroalkysilane applied with a textile and fixed for 20 minutes at 200° C. and/or 250° C. The measurement of the contact angle of water takes place immediately after the making of the coating. The result is a value of 108°. After 500 load cycles of the Schrubb test (performed as above) the contact angle was 81 degrees, after 1000 cycles the contact angle was 68 degrees and after 2000 load cycles, still 67 degrees. Similar values were measured with identically tested hydrophobic glass surfaces prepared by different manufactures with prior art methods.

Example 4 (Comparative Example)

Hydrophobic Coatings Prepared Using Silicone Oils

By applying hydromethylpolysiloxane ("Fluid 1107" of Dow Corning) a hydrophobic glass surface according to the state of the art was prepared: a full surface coating of silicone oils applied with a textile and fixed for 20 minutes at 180° C. The measurement of the contact angle of water takes place immediately after the making of the coating. The result is a value of 108°. After 500 load cycles of the Schrubb test (performed as above) the contact angle was 87 degrees, after 1000 cycles the contact angle was 71 degrees and after 2000 load cycles, still 51 degrees. Similar values were measured with identically tested hydrophobic glass surfaces prepared by different manufactures with prior art methods.

Example 5 (Comparative Example)

Commercially Obtained Hydrophobic Glass Surfaces

Different commercially obtained glass samples with hydrophobic glass surfaces were tested as in example 2 by a load and/or Schrubb test. The results are tabulated in Table I together with the other results described above.

TABLE I

CONTACT ANGLES OF WATER ON DIFFERENT HYDROPHOBIC SURFACES AFTER n LOAD CYCLES

| MAKER | n = 0 | n = 500 | n = 1000 | n = 2000 |
|---|---|---|---|---|
| coating 1, example 2, according to the invention, (250° C.) | 114 | 106 | 102 | 101 |
| coating 2, example 2, according to the invention, (300° C.) | 110 | 102 | 103 | 100 |
| example 3 (comparative, with fluoroalkylsilane coating) | 108 | 81 | 68 | 67 |
| example 4 (comparative, with silicone oil coating) | 102 | 87 | 71 | 51 |
| commerically obtained hydrophobic glass surfaces according to example 5 | 90–99 | 54–89 | 50–71 | — |

The disclosure in German Patent Application 102 36 728.0 of Aug. 9, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a cleaning-friendly apparatus with an easily cleanable, heat-resistant surface coating, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An article with an easily cleaned surface coating that is heat-resistant at temperatures of at least 300° C., has outstanding properties and a thickness between 1 and 1000 nm;
    wherein said surface coating contains a metal oxide network and a hydrophobic substance, said hydrophobic substance being distributed uniformly throughout the metal oxide network and across said thickness of said surface coating;
    wherein said surface coating is hydrophobic and has a contact angle for water of greater than 90°; and
    wherein said hydrophobic substance comprises at least one pre-condensed fluoroalkylsilane formed by hydrolysis of at least one fluoroalkylsilane at temperatures under 60° C.

2. The article as defined in claim 1, further comprising a supporting substrate selected from the group consisting of glass, glass ceramic, metal, ceramic, plastic and laminated material, and wherein said surface coating is provided on said supporting substrate.

3. The article as defined in claim 2, wherein said surface coating is provided on a surface of said supporting substrate to be coated, after activation of said surface of said supporting substratete and/or after applying at least one or more suitable primers to said surface of said supporting substrate.

4. The article as defined in claim 1, wherein said surface coating comprises a plurality of nanoscale particles.

5. The article as defined in claim 1, wherein said surface coating is optically inconspicuous.

6. The article as defined in claim 1, wherein said surface coating is heat-resistant up to temperatures of 400° C.

7. The article as defined in claim 1, wherein said thickness of said surface coating is from 10 to 250 nm.

8. The article as defined in claim 1, further comprising an additional protective layer for said surface coating, and wherein said additional protective layer comprises an enamel.

9. The article as defined in claim 1, consisting of a cooking appliance and/or components for said cooking appliance.

10. The article as defined in claim 1, consisting of at least one of a baking oven, a cooking range, a microwave unit, a grill, an exhaust vapor hood with associated operating unit, a mixer, a blender, a food processor, a cooking vessel, a baking sheet and/or a baking pan.

11. The article as defined in claim 8, wherein said additional protective layer comprises decorative or functional printing and said decorative or functional printing is made with ceramic or organic decorative paint.

12. The article as defined in claim 1, further comprising an additional protective layer for said surface coating, and wherein said additional protective layer comprises decorative or functional printing and said decorative or functional printing is made with ceramic or organic decorative paint.

13. The article as defined in claim 1, wherein said at least one fluoroalkylsilane is a silane compound of the formula (I):

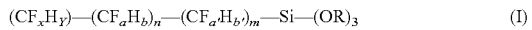

$$(CF_xH_y)-(CF_aH_b)_n-(CF_{a'}H_{b'})_m-Si-(OR)_3 \qquad (I)$$

wherein x is 1, 2 or 3 and x+y=3, a and a' is 0, 1 or 2 and a+b and a'+b'=2 and n and m, independently of each other, are integers from 0 to 20 and n+m<30; and wherein R is a straight chain, branched, saturated or unsaturated $C_1$- to $C_8$-alkyl group optionally containing a heteroatom.

* * * * *